United States Patent
Yoshino et al.

(10) Patent No.: US 12,489,614 B2
(45) Date of Patent: Dec. 2, 2025

(54) PHOTON DETECTION DEVICE, RECEPTION DEVICE, QUANTUM KEY DISTRIBUTION SYSTEM, AND METHOD FOR DETECTING QUANTUM SIGNAL

(71) Applicants: NEC Corporation, Tokyo (JP); National Institute of Information and Communications Technology, Koganei (JP); NATIONAL UNIVERSITY CORPORATION HOKKAIDO UNIVERSITY, Sapporo (JP); The University of Tokyo, Tokyo (JP)

(72) Inventors: Ken-ichiro Yoshino, Tokyo (JP); Mikio Fujiwara, Tokyo (JP); Akihisa Tomita, Hokkaido (JP); Masato Koashi, Tokyo (JP); Masahiro Takeoka, Tokyo (JP); Masahide Sasaki, Tokyo (JP)

(73) Assignees: NEC CORPORATION, Tokyo (JP); NATIONAL INSTITUTE OF INFORMATION AND COMMUNICATIONS TECHNOLOGY, Koganei (JP); National University Corporation Hokkaido University, Sapporo (JP); THE UNIVERSITY OF TOKYO, Tokyo (JP)

(*) Notice: Subject to any disclaimer, the term of this patent is extended or adjusted under 35 U.S.C. 154(b) by 190 days.

(21) Appl. No.: 18/274,288

(22) PCT Filed: Jan. 24, 2022

(86) PCT No.: PCT/JP2022/002434
§ 371 (c)(1),
(2) Date: Jul. 26, 2023

(87) PCT Pub. No.: WO2022/163577
PCT Pub. Date: Aug. 4, 2022

(65) Prior Publication Data
US 2024/0080184 A1 Mar. 7, 2024

(30) Foreign Application Priority Data
Jan. 29, 2021 (JP) .................. 2021-013986

(51) Int. Cl.
*H04L 9/08* (2006.01)
*H04L 9/00* (2022.01)

(52) U.S. Cl.
CPC ............ *H04L 9/0852* (2013.01); *H04L 9/005* (2013.01)

(58) Field of Classification Search
CPC ..... H04L 9/0852; H04L 9/005; H04L 9/0858; G01J 1/42; G01J 11/00; H04B 10/60; H04B 10/70; H10F 30/225
See application file for complete search history.

(56) References Cited

U.S. PATENT DOCUMENTS

| | | | |
|---|---|---|---|
| 2019/0222415 A1* | 7/2019 | Kikawada | H04L 9/0858 |
| 2019/0312723 A1* | 10/2019 | Guo | H04L 9/0858 |
| 2021/0021352 A1* | 1/2021 | Yoshino | H04B 10/556 |

FOREIGN PATENT DOCUMENTS

| | | |
|---|---|---|
| JP | 2003-37594 A | 2/2003 |
| JP | 2008-294934 A | 12/2008 |

(Continued)

OTHER PUBLICATIONS

Bing Qi et al., "Time-Shift Attack in Practical Quantum Cryptosystems", Quantum Information and Computation, vol. 7, No. 1, 2007, pp. 073-082.

(Continued)

*Primary Examiner* — Baotran N To
(74) *Attorney, Agent, or Firm* — Sughrue Mion, PLLC (57) ABSTRACT

An object is to prevent eavesdropping in quantum key distribution. A photon detector outputs an output current (Continued)

indicating a result of detecting a quantum signal. A current-voltage conversion unit converts the output current into an output voltage signal. An analog-to-digital converter outputs an output voltage signal obtained by analog-digital conversion of the output voltage signal. A signal processing unit performs predetermined signal processing on the output voltage signal, and outputs a photon detection signal indicating a result of detecting the quantum signal. When a time difference between a timing at which the quantum signal is incident into the photon detector and a reference timing determined based on a clock signal is not within a determination range, the photon detection signal is not output from the signal processing unit.

7 Claims, 11 Drawing Sheets

(56) References Cited

FOREIGN PATENT DOCUMENTS

| | | |
|---|---|---|
| JP | 2010-166285 A | 7/2010 |
| JP | 2011-75577 A | 4/2011 |
| JP | 2013-539327 A | 10/2013 |
| JP | 2019-125961 A | 7/2019 |
| JP | 2019-522434 A | 8/2019 |
| WO | 2019/106971 A1 | 6/2019 |
| WO | 2019/180770 A1 | 9/2019 |

OTHER PUBLICATIONS

International Search Report for PCT/JP2022/002434 dated Apr. 5, 2022.

* cited by examiner

PHOTON DETECTION DEVICE, RECEPTION DEVICE, QUANTUM KEY DISTRIBUTION SYSTEM, AND METHOD FOR DETECTING QUANTUM SIGNAL

CROSS REFERENCE TO RELATED APPLICATIONS

This application is a National Stage of International Application No. PCT/JP2022/002434 filed Jan. 24, 2022, claiming priority based on Japanese Patent Application No. 2021-013986 filed Jan. 29, 2021.

TECHNICAL FIELD

The present invention relates to a photon detection device, a reception device, a quantum key distribution system, and a method for detecting a quantum signal.

BACKGROUND ART

With the spread of the Internet, there is an increasing social need for encryption technology such as secrecy and tamper prevention of communication and personal authentication. From such a background, in order to ensure communication security, the use of the quantum key distribution technology, which is a technology for sharing a secure secret key consisting of random numbers between remote locations, is in the spotlight because it makes eavesdropping difficult in principle (Patent Literatures 1 to 5).

In quantum key distribution, a quantum signal is generally transmitted from a transmission device to a reception device, and the quantum signal is detected using a plurality of photon detectors provided in the reception device. In this case, if there is a variation (deviation) in detection efficiency between the photon detectors, the variation in detection efficiency may be used in eavesdropping. In the encryption technology, eavesdropping using such deviation in information is widely known. Therefore, it is known that it is preferable that the photon detectors have uniform detection efficiency to suitably prevent eavesdropping.

In quantum key distribution, various eavesdropping attempts such as side channel attacks have been made on quantum cryptographic communications using quantum keys. Among them, there has been known an eavesdropping technique called a time shift attack (Non Patent Literature 1) with which an eavesdropper eavesdrops by manipulating a time at which a quantum signal reaches a photon detector without directly eavesdropping on the quantum signal by utilizing the vulnerability of the photon detector that detects the quantum signal.

CITATION LIST

Patent Literature

Patent Literature 1: Japanese Unexamined Patent Application Publication No. 2011-75577
Patent Literature 2: Japanese Unexamined Patent Application Publication No. 2019-125961
Patent Literature 3: Published Japanese Translation of PCT International Publication for Patent Application, No. 2019-522434
Patent Literature 4: Published Japanese Translation of PCT International Publication for Patent Application, No. 2013-539327
Patent Literature 5: Japanese Unexamined Patent Application Publication No. 2010-166285

Non Patent Literature

Non Patent Literature 1: Bing Qi, et. Al., "TIME-SHIFT ATTACK IN PRACTICAL QUANTUM CRYPTO-SYSTEMS", 2007, Quantum Information and Computation, vol. 7, pp. 073-082

SUMMARY OF INVENTION

Technical Problem

In general, in quantum key distribution, a plurality of photon detectors are used to detect a quantum signal. Ideally, the quantum signal is carried by one photon, but actually, the quantum signal may be carried by two or more photons. However, since the intensity of the quantum signal is weak in any case, an avalanche photodiode (APD) capable of amplifying the received weak signal and outputting the amplified signal is used for a photon detector.

Figure 10:
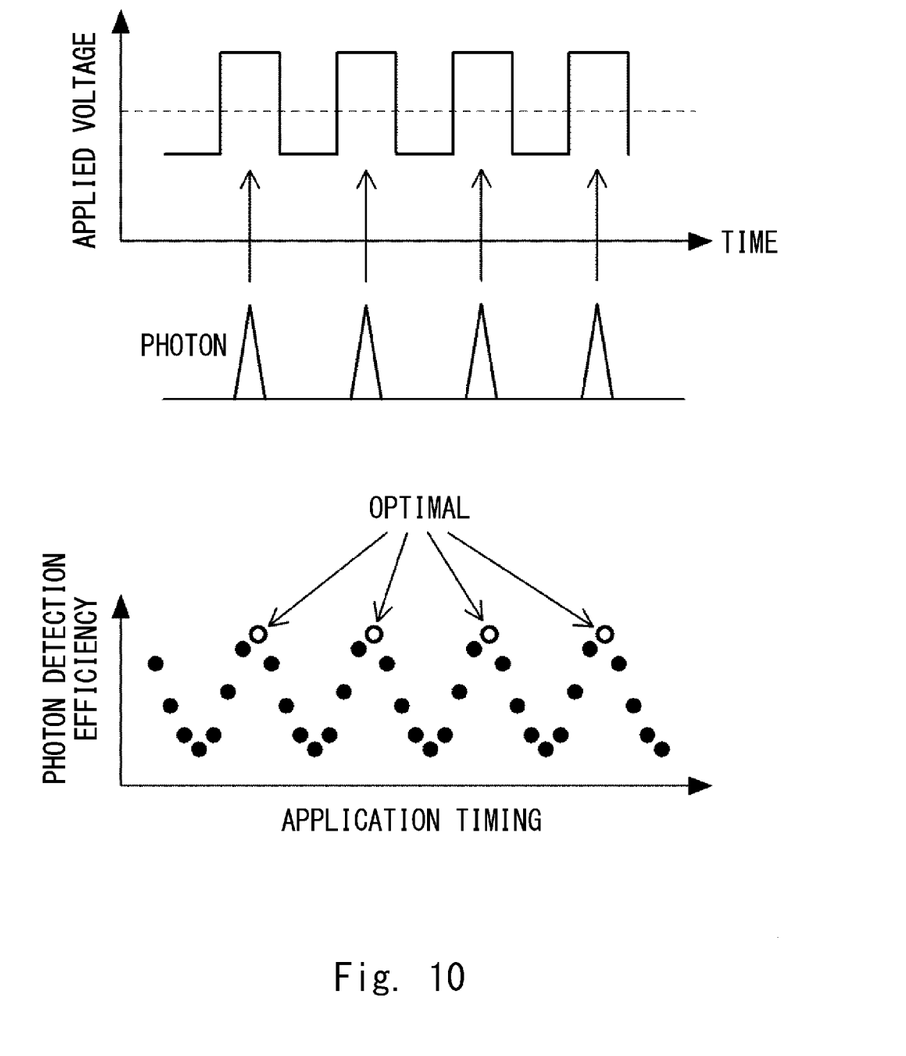
FIG. 10 is a diagram schematically illustrating a timing at which a voltage is applied to an APD and a degree of dependence of photon detection efficiency on time.

In the APD, an electron avalanche phenomenon results from electrons generated when a photon is incident in a state where a reverse bias exceeding a breakdown voltage is applied, which makes it possible to amplify a signal. Therefore, in quantum key distribution, a high reverse bias voltage is applied to the APD so that its application timing is synchronized with a timing at which a photon of the quantum signal is incident (e.g., Patent Literature 1). FIG. 10 schematically illustrates a timing at which a voltage is applied to the APD and a degree of dependence of photon detection efficiency on time. When the timing at which the reverse bias is applied to the APD coincides with the timing at which the photon is incident, the photon detection efficiency of the APD is maximized. However, it is known that, in a case where there is a time difference between the timing at which the reverse bias is applied to the APD and the timing at which the photon is incident, the detection efficiency of the APD decreases as the time difference increases. That is, the photon detection efficiency of the APD depends on the timing at which the photon is incident.

Figure 11:
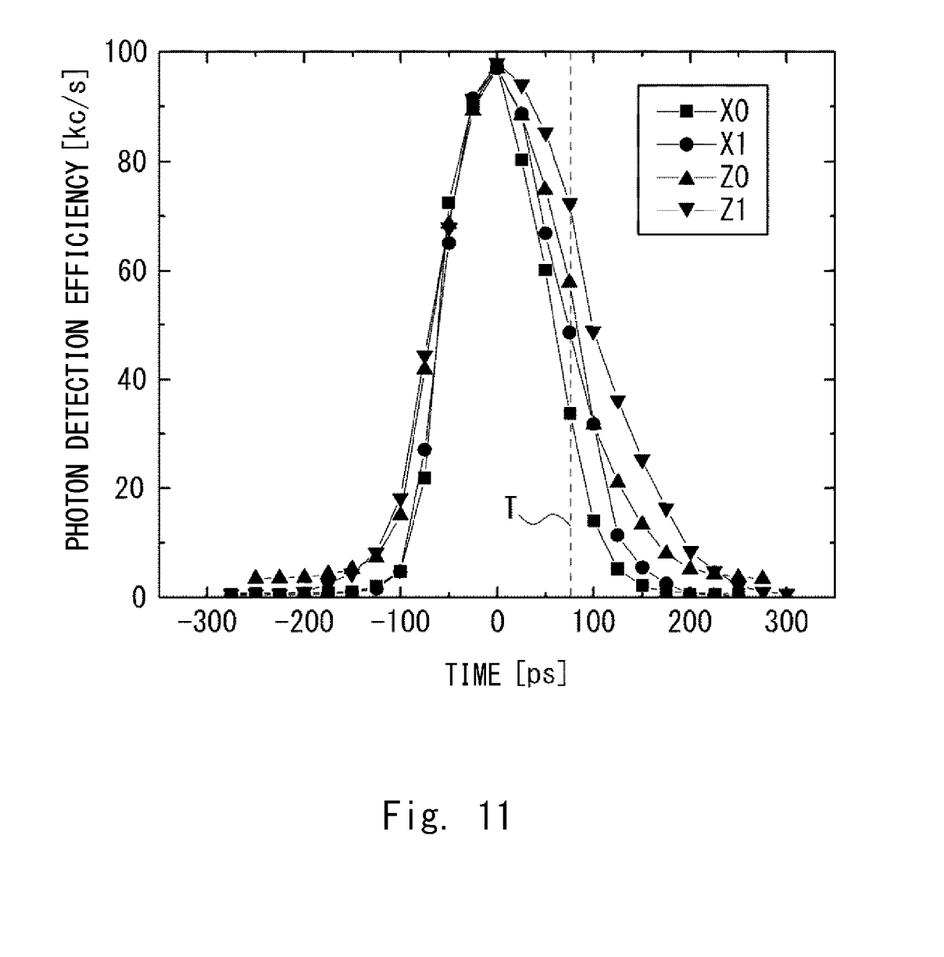
FIG. 11 is a diagram illustrating examples of degrees of dependence of photon detection efficiency on incident timing in a plurality of photon detectors.

In quantum key distribution, while a plurality of photon detectors (APD) are used, it is preferable that the photon detectors have the same photon detection efficiency to ensure high security. However, the photon detectors have individual differences in degree of dependence of photon detection efficiency on incident timing. FIG. 11 illustrates examples of degrees of dependence of photon detection efficiency on incident timing in the plurality of photon detectors. In the examples illustrated in FIG. 11, bits 0 and 1 of the X basis and bits 0 and 1 of the Z basis are detected by four photon detectors. As illustrated in FIG. 11, even though photons are incident at the same timing (e.g., timing T in FIG. 11), photon detection efficiency varies between the plurality of photon detectors.

Since each of the plurality of photon detectors is allocated to each bit of one of the bases of the quantum signal, if there is a variation in degree of dependence of photon detection efficiency on incident timing between the photon detectors, for example, the detection efficiency of each bit of each basis is analyzed, and as a result, a situation in which eavesdropping is permitted may occur. Therefore, it is required to prevent or suppress the influence of degree of dependence of photon detection efficiency on incident timing in the photon detector.

The present invention has been made in view of the above circumstances, and an object thereof is to prevent eavesdropping in quantum key distribution.

Solution to Problem

A photon detection device according to an aspect of the present invention includes: a photon detector configured to output a current signal indicating a result of detecting a quantum signal; a current-voltage conversion unit configured to convert the current signal into a voltage signal; an analog-to-digital converter configured to output an output signal obtained by analog-to-digital conversion of the voltage signal; and a signal processing unit configured to perform predetermined signal processing on the output signal, and output a detection signal indicating a result of detecting the quantum signal, in which when a time difference between a timing at which the current signal is output from the photon detector and a reference timing determined based on a clock signal is not within a determination range, the detection signal is not output from the signal processing unit.

A reception device according to an aspect of the present invention includes a photon detection device configured to detect a quantum signal, in which the photon detection device includes: a photon detector configured to output a current signal indicating a result of detecting the quantum signal; a current-voltage conversion unit configured to convert the current signal into a voltage signal; an analog-to-digital converter configured to output an output signal obtained by analog-to-digital conversion of the voltage signal; and a signal processing unit configured to perform predetermined signal processing on the output signal, and output a detection signal indicating a result of detecting the quantum signal, and when a time difference between a timing at which the current signal is output from the photon detector and a reference timing determined based on a clock signal is not within a determination range, the detection signal is not output from the signal processing unit.

A quantum key distribution system according to an aspect of the present invention includes: a transmission device configured to transmit a quantum signal; and a reception device including a photon detection device configured to detect the quantum signal, in which the photon detection device includes: a photon detector configured to output a current signal indicating a result of detecting the quantum signal; a current-voltage conversion unit configured to convert the current signal into a voltage signal; an analog-to-digital converter configured to output an output signal obtained by analog-to-digital conversion of the voltage signal; and a signal processing unit configured to perform predetermined signal processing on the output signal, and output a detection signal indicating a result of detecting the quantum signal, and when a time difference between a timing at which the current signal is output from the photon detector and a reference timing determined based on a clock signal is not within a determination range, the detection signal is not output from the signal processing unit.

A method for detecting a quantum signal according to an aspect of the present invention includes: outputting a current signal indicating a result of detecting the quantum signal; converting the current signal into a voltage signal; outputting an output signal obtained by analog-to-digital conversion of the voltage signal; and performing predetermined signal processing on the output signal, and outputting a detection signal indicating a result of detecting the quantum signal, in which when a time difference between a timing at which the current signal is output and a reference timing determined based on a clock signal is not within a determination range, the detection signal is not output.

Advantageous Effects of Invention

According to the present invention, it is possible to prevent eavesdropping in quantum key distribution.

EXAMPLE EMBODIMENT

Hereinafter, example embodiments of the present invention will be described with reference to the drawings. In the drawings, the same elements are denoted by the same reference signs, and redundant description will be omitted as necessary.

First Example Embodiment

A quantum key distribution system 1000 according to a first example embodiment will be described. For example, the quantum key distribution system 1000 is configured as one to which a BB84 protocol in a phase encoding type or in a polarization encoding type is applied.

Figure 1:
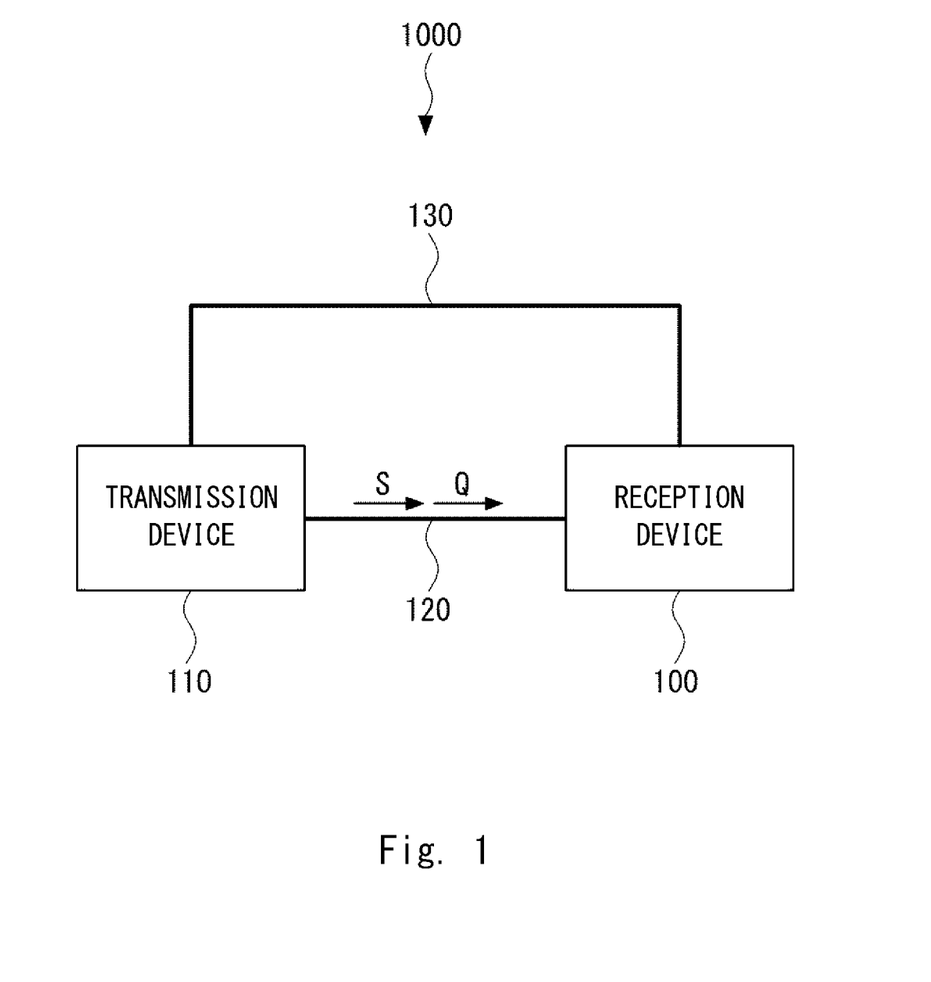
FIG. 1 is a diagram illustrating a schematic configuration of a quantum key distribution system.

FIG. 1 illustrates a schematic configuration of the quantum key distribution system 1000. The quantum key distribution system 1000 includes a transmission device 110, a reception device 100, and transmission paths 120 and 130. The transmission device 110 outputs a quantum signal Q used for giving an encryption key to the reception device 100 and a synchronization signal S used for controlling a timing at which the quantum signal Q is detected to the reception device 100 via the transmission path 120. Furthermore, the transmission device 110 and the reception device 100 can transmit and receive signals including, for example, basis information, test bits, error correction information, and the like via the transmission path 130 that is a public communication path.

The quantum signal Q is an optical signal transmitted as a light pulse consisting of a single photon or a number of photons sufficient to exhibit a quantum effect.

In the present example embodiment, the synchronization signal S is an optical signal transmitted through the transmission path 120 used for transmitting the quantum signal Q. The quantum signal Q and the synchronization signal S are, for example, optical signals having different wavelengths, and may be transmitted to the reception device 100 after being wavelength-multiplexed.

Figure 2:
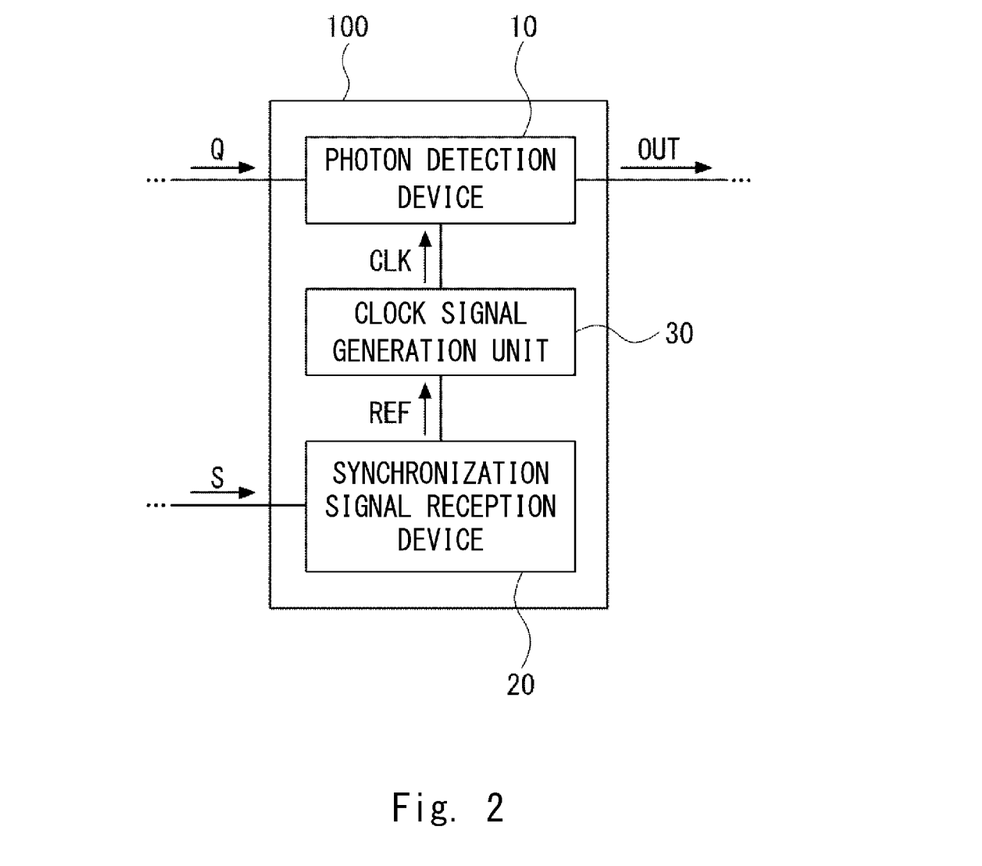
FIG. 2 is a diagram schematically illustrating a basic configuration of a reception device according to the first example embodiment.

FIG. 2 schematically illustrates a basic configuration of reception device 100 according to the first example embodiment. The reception device 100 includes a photon detection device 10, a synchronization signal reception device 20, and a clock signal generation unit 30. The quantum signal Q and the synchronization signal S are input to the reception device 100, the quantum signal Q is detected by the photon detection device 10, and the synchronization signal S is received by the synchronization signal reception device 20.

The clock signal generation unit 30 is configured by, for example, a phase locked loop (PLL), and generates a clock signal CLK and outputs the clock signal CLK to the photon detection device 10 and the synchronization signal reception device 20. In the present configuration, the clock signal generation unit 30 adjusts the timing of the clock signal CLK in response to a reference signal REF given from the synchronization signal reception device 20 to notify a timing at which the synchronization signal S is received. The clock signal CLK is generated as a high-speed clock signal having higher time accuracy than a reverse bias pulse timing signal and an output voltage signal, which will be described below.

Figure 3:
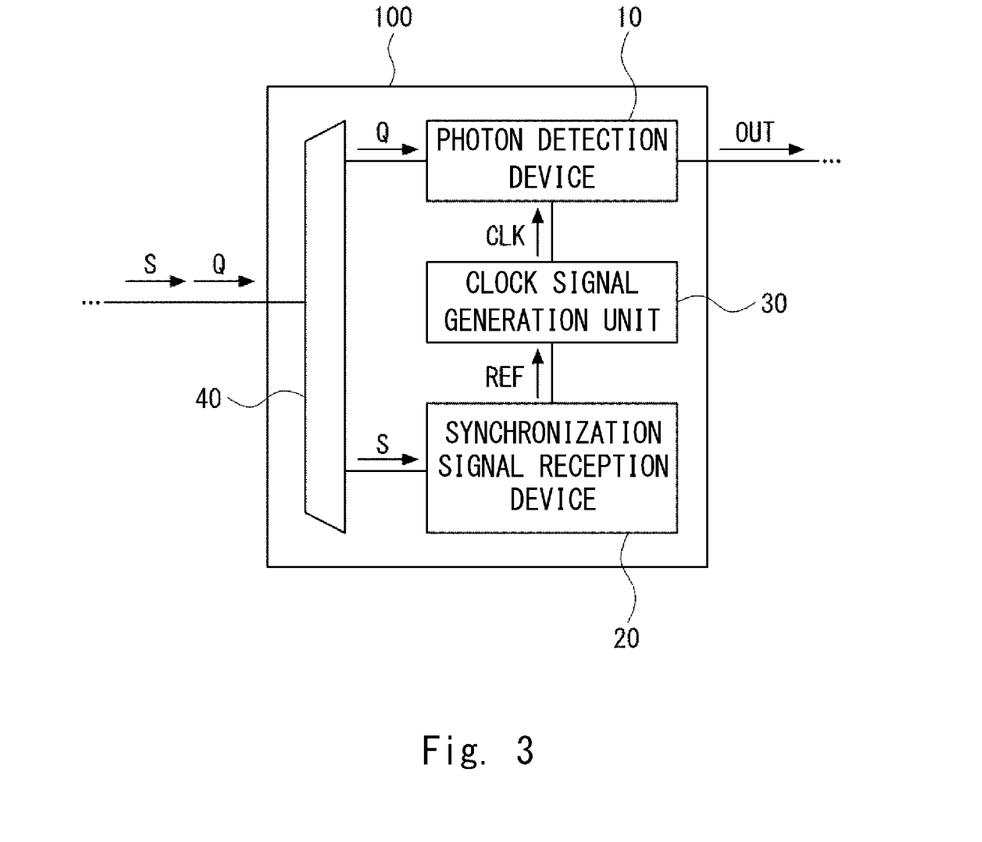
FIG. 3 is a diagram schematically illustrating an example of the configuration of the reception device according to the first example embodiment.

Next, the reception device 100 will be further described. FIG. 3 schematically illustrates an example of a configuration of the reception device 100 according to the first example embodiment. The reception device 100 includes, for example, a wavelength separation unit 40 that wavelength-separates the quantum signal Q and the synchronization signal S from each other. As a result, the quantum signal Q can be detected by the photon detection device 10, and the synchronization signal S can be received by the synchronization signal reception device 20. The wavelength separation unit 40 can be configured as any wavelength separation means such as a WDM coupler.

Next, the photon detection device 10 will be described. Here, in order to facilitate the understanding of the configuration of the photon detection device 10, a circuit configuration for detecting incident photons using one avalanche photodiode, which is a photon detector, and an output current of the one avalanche photodiode will be described. Note that, needless to say, the circuit configuration illustrated in FIG. 4, which will be described below, is multiply provided in the photon detection device according to a basis or the like used in quantum key distribution. Furthermore, it goes without saying that a configuration (not illustrated for simplification) for distributing photons to a plurality of photon detectors (avalanche photodiodes) is provided according to an encoding type (phase encoding, polarization encoding, or the like) applied to a quantum signal to be transmitted.

Figure 4:
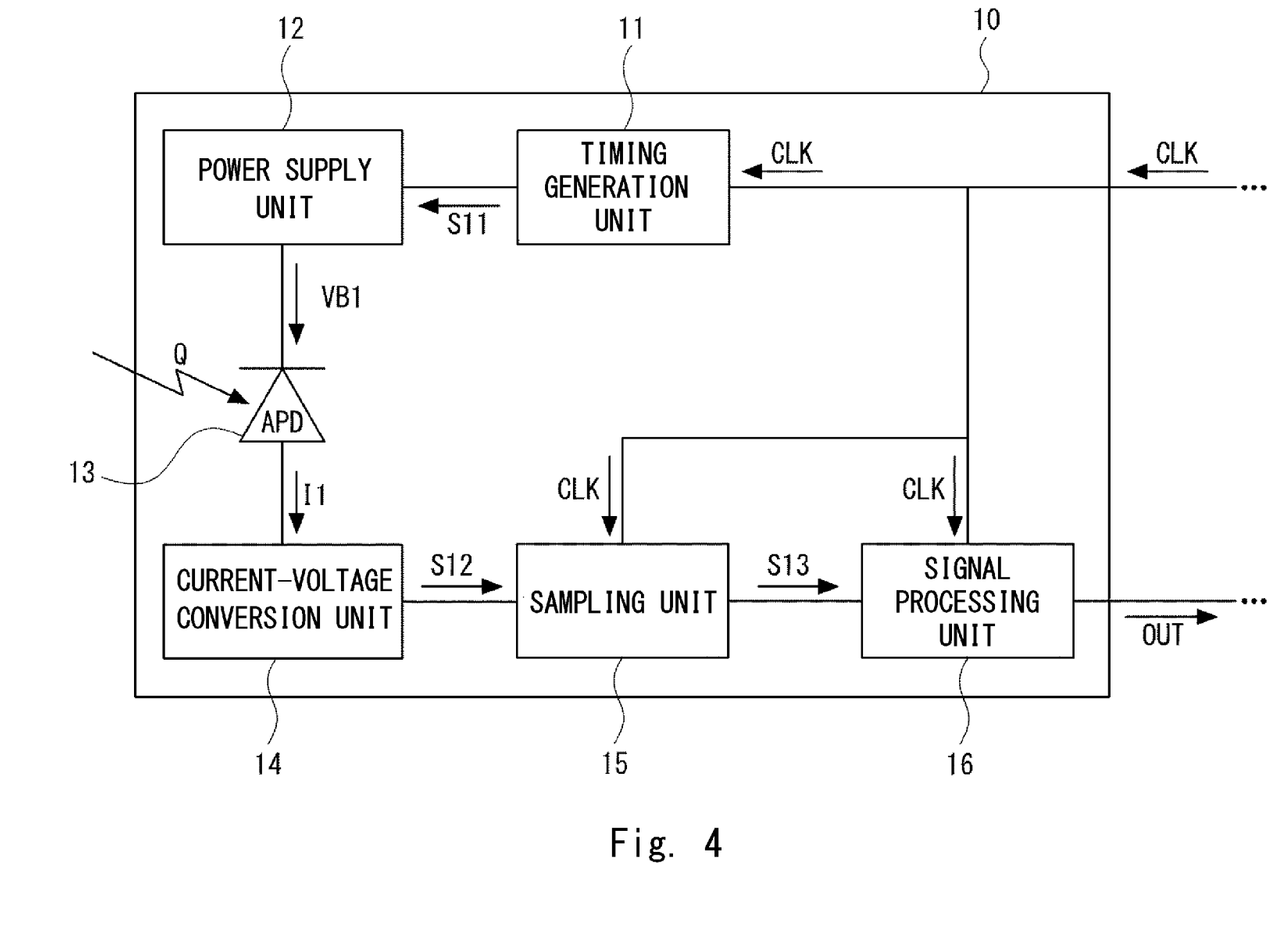
FIG. 4 is a diagram schematically illustrating a configuration of a photon detection device according to the first example embodiment.

FIG. 4 schematically illustrates a configuration of the photon detection device 10 according to the first example embodiment. The photon detection device 10 according to the first example embodiment includes a timing generation unit 11, a power supply unit 12, an avalanche photodiode (APD) 13, a current-voltage conversion unit 14, a sampling unit 15, and a signal processing unit 16.

The timing generation unit 11 generates a reverse bias pulse timing signal S11 in response to the clock signal CLK, and outputs the generated reverse bias pulse timing signal S11 to the power supply unit 12. The clock signal CLK is supplied from the clock signal generation unit 30 as will be described below.

The power supply unit 12 generates a reverse bias voltage VB1, and applies the generated reverse bias voltage VB1 to the APD 13 in response to the reverse bias pulse timing signal S11. The reverse bias voltage VB1 includes a DC component equal to or lower than the breakdown voltage of the APD 13 and a reverse bias pulse component equal to or higher than the breakdown voltage.

In the APD 13, when a photon, that is, the quantum signal Q, is incident into a light receiving surface at a timing when the reverse bias pulse component is applied to the APD 13, electrons are multiplied by an avalanche (electron avalanche) effect caused by generated photoelectrons. As a result, an output current I1 is output from the APD 13. Note that even in a case where no photon is incident, the output current I1 is detected as a current having a constant value because dark noise exists.

The current-voltage conversion unit 14 converts the output current I1 (also referred to as a current signal) into an output voltage signal S12, which is a voltage signal, and outputs the generated output voltage signal S12 to the sampling unit 15. Here, a transimpedance amplifier (hereinafter referred to as TIA) or the like is used as the current-voltage conversion unit 14.

The sampling unit 15 samples the output voltage signal S12 in response to the clock signal CLK, and outputs an output voltage signal S13 having a discrete value, that is, a digital signal, to the signal processing unit 16. The sampling unit 15 may output a two-value digital signal, or may output a multi-value digital signal generated by analog-digital (AD) conversion. Here, an analog-digital converter (ADC) is used as the sampling unit 15.

In response to the clock signal CLK, the signal processing unit 16 performs predetermined signal processing on the output voltage signal S13, which is the digital signal, and outputs a photon detection signal OUT indicating a photon reception result.

Figure 5:
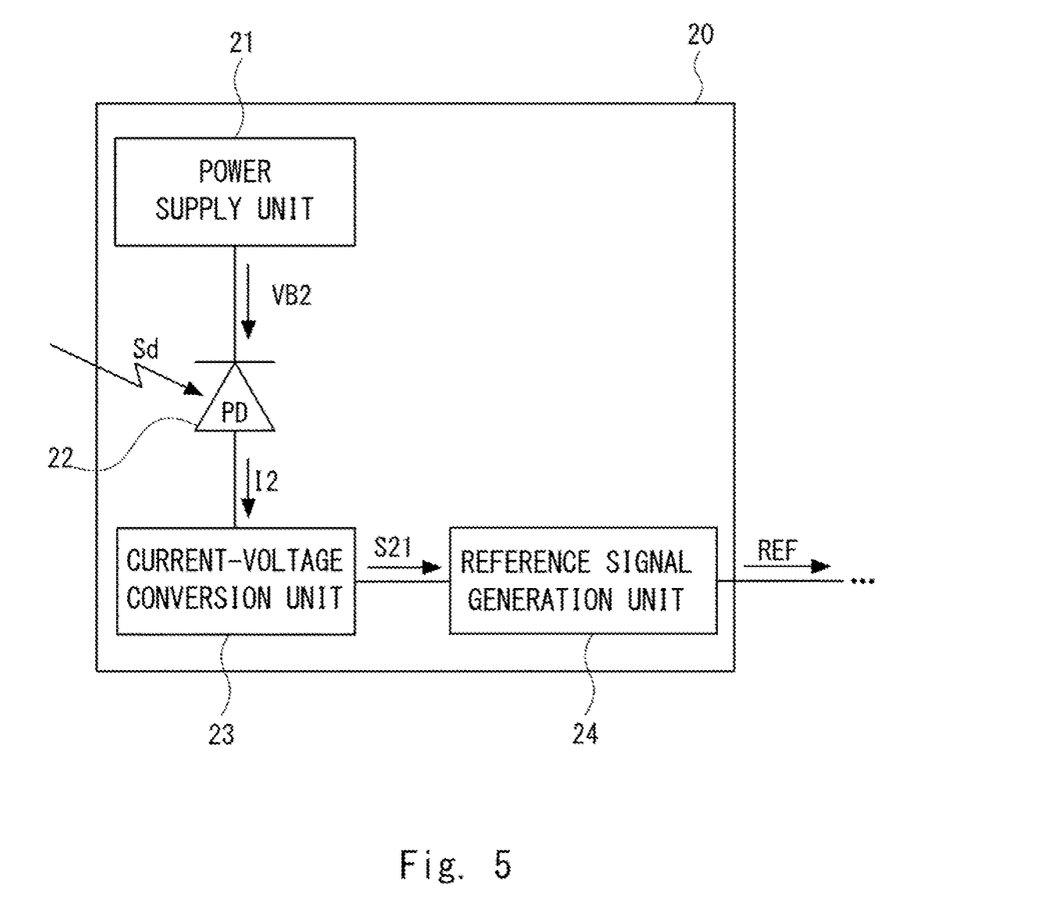
FIG. 5 is a diagram schematically illustrating a configuration of a synchronization signal reception device according to the first example embodiment.

Next, the synchronization signal reception device 20 will be described. FIG. 5 schematically illustrates a configuration of the synchronization signal reception device 20 according to the first example embodiment. The synchronization signal reception device 20 includes a power supply unit 21, a photodiode 22, a current-voltage conversion unit 23, and a reference signal generation unit 24.

The power supply unit 21 generates a reverse bias voltage VB2, and applies the generated reverse bias voltage VB2 to the photodiode 22. The reverse bias voltage VB2 is output as, for example, a DC voltage of about several volts.

When a synchronization signal S (a synchronization signal Sd to be described below in this example) is incident into the light receiving surface in a state where the reverse bias voltage VB2 is applied, the photodiode 22 outputs an output current I2 corresponding to the intensity of the incident light. In general, the synchronization signal S has a higher light intensity than the quantum signal Q. Therefore, the type of the photodiode 22 that receives the synchronization signal S is not particularly limited, and various types of photodiodes including an APD can be used.

The current-voltage conversion unit 23 converts the output current I2 into an output voltage signal S21, which is a voltage signal, and outputs the output voltage signal S21 to the reference signal generation unit 24. Here, a transimpedance amplifier (hereinafter referred to as TIA) or the like is used as the current-voltage conversion unit 23.

The reference signal generation unit 24 outputs the reference signal REF, which is a digital signal, to the clock signal generation unit 30 in response to the output voltage signal S21. The reference signal generation unit 24 may output a two-value digital signal, or may output a multi-value digital signal generated by analog-digital (A/D) conversion. The reference signal generation unit 24 may be configured as, for example, a clock data recovery (CDR) circuit.

Figure 6:
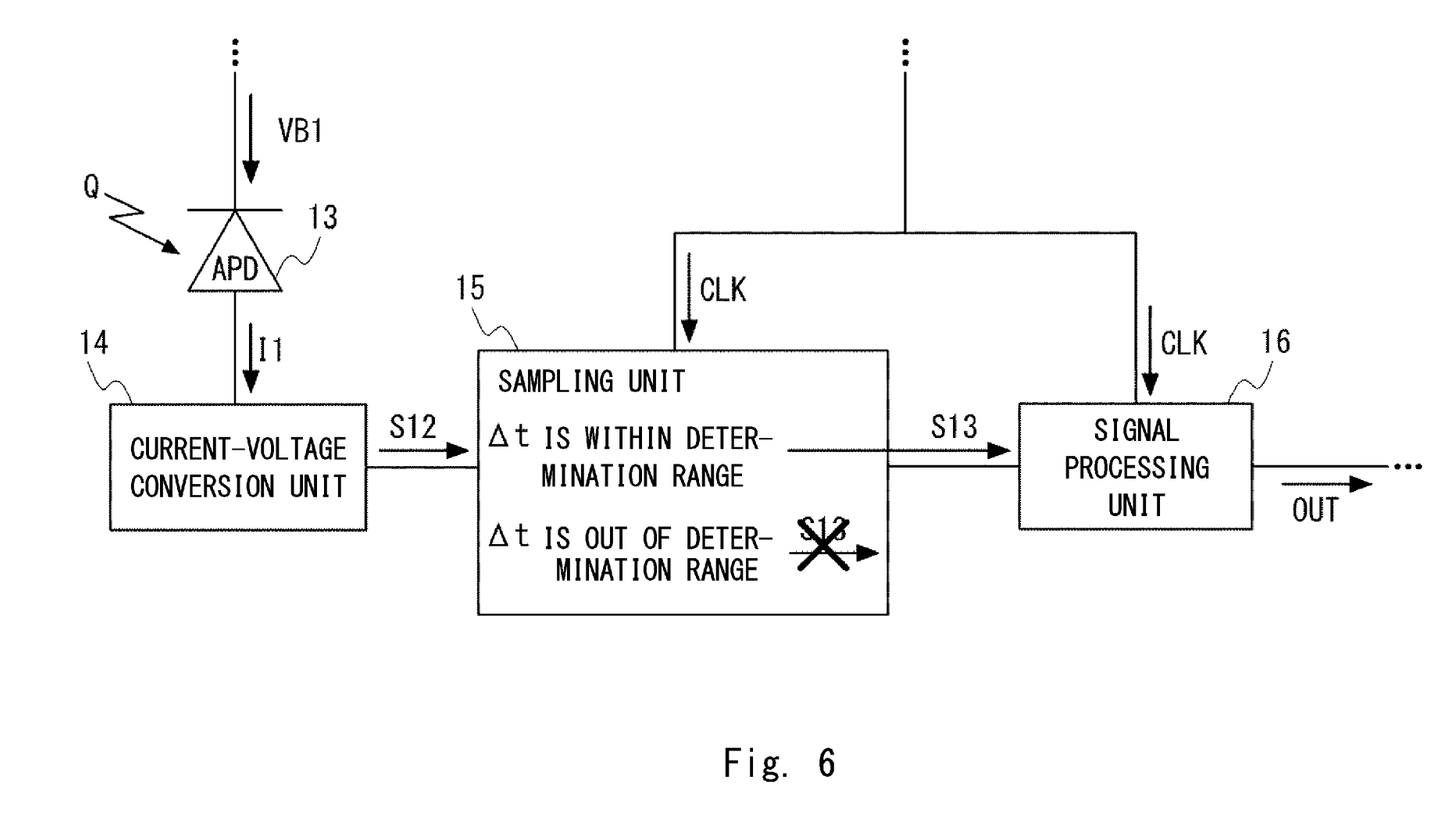
FIG. 6 is a diagram illustrating a signal flow in an eavesdropping prevention operation of the photon detection device according to the first example embodiment.
Figure 7:
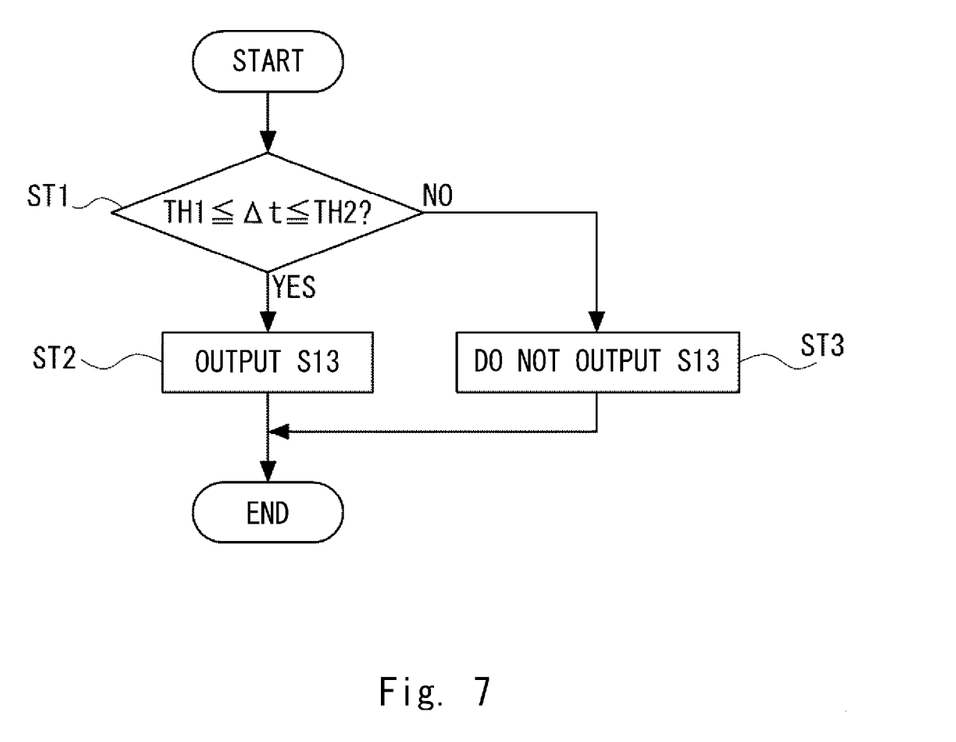
FIG. 7 is a flowchart of the eavesdropping prevention operation of the photon detection device according to the first example embodiment.

Next, the operation of the photon detection device 10 for preventing eavesdropping will be described. FIG. 6 illustrates a signal flow in the eavesdropping prevention operation of the photon detection device 10 in response to the first example embodiment. FIG. 7 is a flowchart of the eavesdropping prevention operation of the photon detection device 10 according to the first example embodiment.

Since the clock signal CLK is generated in response to the received synchronization signal S as described above, it can be considered as an accurate timing signal. On the other hand, for example, when an eavesdropper attempts eavesdropping using a time shift attack, a false quantum signal QF transmitted by the eavesdropper may be incident into the reception device 100.

The false quantum signal QF is incident at an earlier or later timing than a correct quantum signal Q, and thus, it is possible to determine whether the quantum signal is true or false by detecting a timing at which the quantum signal is incident. Therefore, in the present configuration, a time difference $\Delta t$ (also referred to as a first time difference) between the clock signal CLK and the timing at which the quantum signal is incident, that is, the timing at which the output current I1 is output from the APD 13 is detected, and when the time difference $\Delta t$ is out of the predetermined range, information regarding the received quantum signal is discarded. This can prevent eavesdropping. Hereinafter, this will be described in detail.

As illustrated in FIG. 6, in the present configuration, the sampling unit 15 samples the output voltage signal S12, which is an analog signal, in response to the clock signal CLK for conversion into an output voltage signal S13, which is a digital signal. Here, a time at which the quantum signal Q is incident into the APD 13 (a time at which the output current I1 is output) is defined as t, a time period from the time t until the output voltage signal S12 reaches the sampling unit 15 is defined as $\Delta t_{d1}$, and a reference timing based on the clock signal CLK is defined as $T_{ref}$. In this case, the sampling unit 15 may monitor a time difference $\Delta t$ between a time t+$\Delta t_{d1}$ at which the output voltage signal S12 reaches the sampling unit 15 and the reference timing $T_{ref}$, and determine whether the time difference $\Delta t$ is out of a predetermined range (also referred to as a first determination range). It can be understood that the sampling unit 15 indirectly monitors a timing at which the output current I1 is output from the APD 13 by monitoring the time difference $\Delta t$.

For example, the sampling unit 15 monitors the time difference $\Delta t$, and determines whether the time difference $\Delta t$ is equal to or larger than a first threshold value TH1 (also referred to as a lower limit threshold value) and equal to or smaller than a second threshold value TH2 (also referred to as an upper limit threshold value) (step ST1 in FIG. 7).

When the time difference $\Delta t$ is equal to or larger than the first threshold value TH1 and equal to or smaller than the second threshold value TH2, that is, when the time difference $\Delta t$ is within a determination range defined by the first threshold value TH1 and the second threshold value TH2, the sampling unit 15 outputs the output voltage signal S13 that is an A/D conversion result, determining that the received quantum signal Q is a true quantum signal (step ST2 in FIG. 7).

When the time difference $\Delta t$ is smaller than the first threshold value TH1 or larger than the second threshold value TH2, that is, when the time difference $\Delta t$ is out of the determination range, the sampling unit 15 discards the received quantum signal Q without outputting the output voltage signal S13 that is the A/D conversion result described above, determining that the received quantum signal Q is a false quantum signal (step ST3 in FIG. 7).

As described above, according to the present configuration, the information of the quantum signal of which the timing deviates from the clock signal CLK by the predetermined value can be discarded by the determination of the time difference in the sampling unit 15. Accordingly, as described above, eavesdropping can be suitably prevented.

In particular, according to the present configuration, if a timing at which a current is output from the photon detector, in other words, a timing at which a photon is incident into the photon detector, deviates in a predetermined degree or more, it is possible to discard information regarding that photon, thereby suitably preventing eavesdropping using a time shift attack utilizing dependence on the timing at which the photon is incident into the photon detector.

Figure 8:
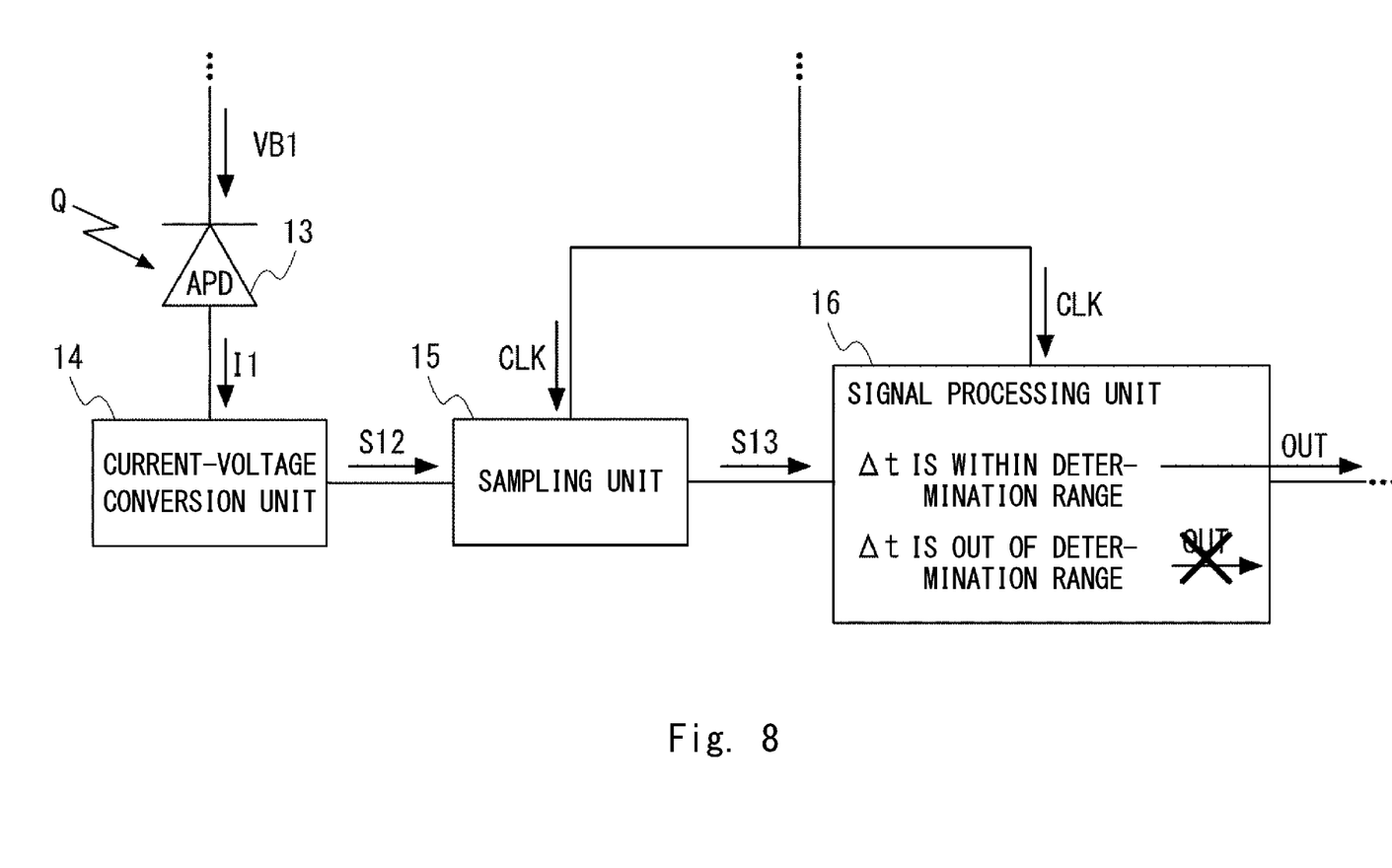
FIG. 8 is a diagram illustrating a signal flow in an eavesdropping prevention operation of the photon detection device according to the first example embodiment.
Figure 9:
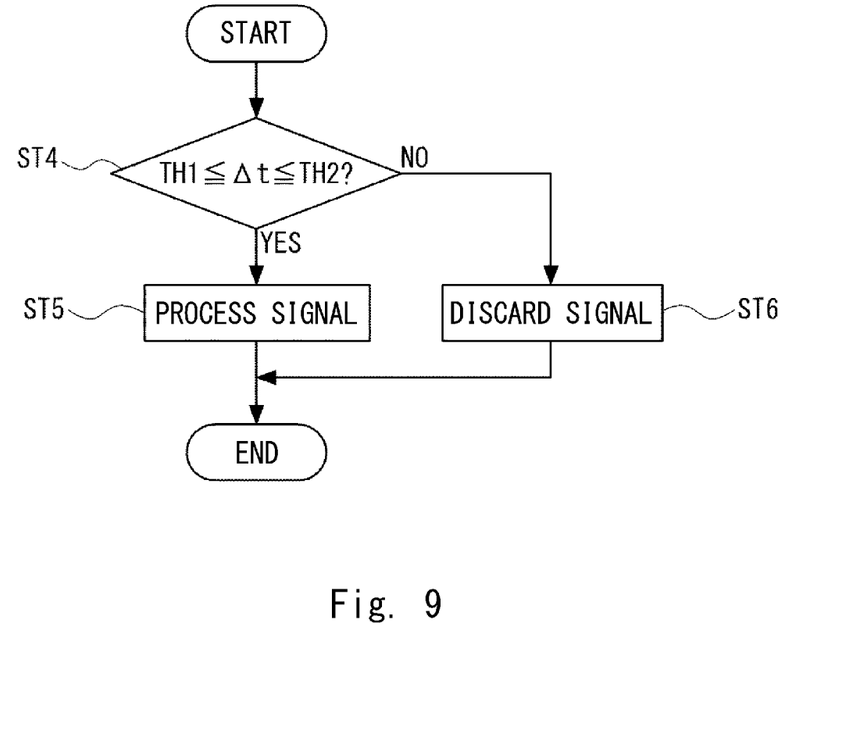
FIG. 9 is a flowchart of the eavesdropping prevention operation of the photon detection device according to the first example embodiment.

Furthermore, the determination of the time difference described above may be performed by the signal processing unit 16 instead of the sampling unit 15. Hereinafter, the eavesdropping prevention operation of the photon detection device 10 in a case where the determination of the time difference is performed by the signal processing unit 16 will be described. FIG. 8 illustrates a signal flow in the eavesdropping prevention operation of the photon detection device 10 according to the first example embodiment. FIG. 9 is a flowchart of the eavesdropping prevention operation of the photon detection device 10 according to the first example embodiment.

As illustrated in FIG. 8, in the present configuration, the signal processing unit 16 performs predetermined signal processing on the output voltage signal S13 in response to the clock signal CLK. Here, a time period from the time t at which the quantum signal Q is incident into the APD 13 until the output voltage signal S13 reaches the signal processing unit 16 is defined as $\Delta t_{d2}$. In this case, the signal processing unit 16 may monitor a time difference $\Delta t$ between a time t+$\Delta t_{d2}$ at which the output voltage signal S13 reaches the signal processing unit 16 and the reference timing $T_{ref}$, and determine the time difference as in the case of the sampling unit 15. In this case as well, similarly to what has been described above, it can be understood that the signal processing unit 16 indirectly monitors a timing at which the output current I1 is output from the APD 13 by monitoring the time difference $\Delta t$.

For example, the signal processing unit 16 monitors the time difference $\Delta t$ (also referred to as a second time difference) and determines whether the time difference $\Delta t$ is equal to or larger than the first threshold value TH1 and equal to or smaller than the second threshold value TH2 (step ST4 in FIG. 9).

When the time difference Δt is within a determination range (also referred to as a second determination range) defined by the first threshold value TH1 and the second threshold value TH2, the signal processing unit 16 determines that the received quantum signal Q is a true quantum signal, and the signal processing unit 16 performs the above-described signal processing (step ST5 in FIG. 9).

When the time difference Δt is out of the determination range, the signal processing unit 16 discards the output voltage signal S13 without performing the above-described signal processing, determining that the received quantum signal Q is a false quantum signal (step ST6 in FIG. 9).

As described above, according to the present configuration, the information of the quantum signal of which the timing deviates from the clock signal CLK by the predetermined value can be discarded by the determination of the time difference in the signal processing unit 16. As a result, it is possible to suitably prevent eavesdropping as in the case of the sampling unit 15.

OTHER EXAMPLE EMBODIMENTS

Note that the present invention is not limited to the above-described example embodiments, and can be appropriately changed without departing from the gist. For example, it has been described in each of the above-described example embodiments that an avalanche photodiode is used as a single-photon detector, but a single-photon detector having another configuration may be applied as long as the single-photon detector has photon detection efficiency depending on a timing at which a photon is incident.

It has been described in each of the above-described example embodiments that the time difference is within the determination range when the time difference is equal to or larger than the lower limit threshold value of the determination range and equal to or smaller than the upper limit threshold value of the determination range, but this is merely an example. For example, when the time difference is larger than the lower limit threshold value of the determination range and smaller than the upper limit threshold value of the determination range, the time difference may be determined as being within the determination range.

Although the invention of the present application has been described above with reference to the example embodiments, the invention of the present application is not limited to the above. Various modifications that can be understood by those skilled in the art can be made to the configuration and details of the invention of the present application within the scope of the invention.

This application claims priority based on Japanese Patent Application No. 2021-13986 filed on Jan. 29, 2021, the disclosure of which is incorporated herein in its entirety.

REFERENCE SIGNS LIST

10 PHOTON DETECTION DEVICE
11, 21 TIMING GENERATION UNIT
12, 21 POWER SUPPLY UNIT
13 AVALANCHE PHOTODIODE (APD)
14, 23 CURRENT-VOLTAGE CONVERSION UNIT
15 SAMPLING UNIT
16 SIGNAL PROCESSING UNIT
20 SYNCHRONIZATION SIGNAL RECEPTION DEVICE
22 PHOTODIODE
24 REFERENCE SIGNAL GENERATION UNIT
30 CLOCK SIGNAL GENERATION UNIT
40 WAVELENGTH SEPARATION UNIT
100 RECEPTION DEVICE
110 TRANSMISSION DEVICE
120, 130 TRANSMISSION PATH
1000 QUANTUM KEY DISTRIBUTION SYSTEM
CLK CLOCK SIGNAL
I1, I2 OUTPUT CURRENT
OUT PHOTON DETECTION SIGNAL
Q QUANTUM SIGNAL
REF REFERENCE SIGNAL
S SYNCHRONIZATION SIGNAL
S11 REVERSE BIAS PULSE TIMING SIGNAL
S12, S13, S21 OUTPUT VOLTAGE SIGNAL
VB1, VB2 REVERSE BIAS VOLTAGE

The invention claimed is:

1. A photon detection device comprising:
a single photon detector that outputs a current signal indicating a result of detecting a quantum signal;
a current-voltage converter that converts the current signal into a voltage signal;
an analog-to-digital converter that outputs an output signal obtained by analog-to-digital conversion of the voltage signal; and
a signal processor that performs predetermined signal processing on the output signal, and output a detection signal indicating the result of detecting the quantum signal,
wherein when a time difference between a timing at which the current signal is output from the single photon detector and a reference timing determined based on a clock signal is not within a determination range, the detection signal is not output from the signal processor.

2. The photon detection device according to claim 1, wherein the analog-to-digital converter:
outputs the output signal to the signal processor when a first time difference between a timing at which the current signal is input and the reference timing is within a first determination range; and
discards the output signal when the first time difference is not within the first determination range.

3. The photon detection device according to claim 1, wherein the signal processor:
outputs the detection signal when a second time difference between a timing at which the output signal is input and the reference timing is within a second determination range; and
discards the detection signal when the second time difference is not within the second determination range.

4. The photon detection device according to claim 1, wherein:
when the time difference is equal to or larger than a lower limit threshold value of the determination range and equal to or smaller than an upper limit threshold value of the determination range, it is determined that the time difference is within the determination range, and
when the time difference is smaller than the lower limit threshold value of the determination range or larger than the upper limit threshold value of the determination range, it is determined that the time difference is not within the determination range.

5. The photon detection device according to claim 1, wherein:
when the time difference is larger than a lower limit threshold value of the determination range and smaller than an upper limit threshold value of the determination range, it is determined that the time difference is within the determination range, and when the time difference is equal to or smaller than the lower limit threshold value of the determination range or equal to or larger than the upper limit threshold value of the determination range, it is determined that the time difference is not within the determination range.

6. A reception device comprising a photon detection device configured to detect a quantum signal, wherein:

the photon detection device includes:

a single photon detector that outputs a current signal indicating a result of detecting the quantum signal;

a current-voltage convertor that converts the current signal into a voltage signal;

an analog-to-digital converter that outputs signal obtained by analog-to-digital conversion of the voltage signal; and a signal processor that performs predetermined signal processing on the output signal, and output a detection signal indicating the result of detecting the quantum signal, and when a time difference between a timing at which the current signal is output from the single photon detector and a reference timing determined based on a clock signal is not within a determination range, the detection signal is not output from the signal processor.

7. A method for detecting a quantum signal, the method comprising:

outputting, by a single photon detector, a current signal indicating a result of detecting the quantum signal;

converting, by a current-voltage convertor, the current signal into a voltage signal;

outputting, by an analog-to-digital converter, an output signal obtained by analog-to-digital conversion of the voltage signal; and performing, by a signal processor, predetermined signal processing on the output signal, and outputting a detection signal indicating the result of detecting the quantum signal, wherein when a time difference between a timing at which the current signal is output from the single photon detector and a reference timing determined based on a clock signal is not within a determination range, the detection signal is not output by the signal processor.

* * * * *